Jan. 28, 1964 G. E. COMSTOCK 3D 3,119,996

CODE GENERATOR WITH NON-CONTACTING COUPLING TO CHARACTER KEYS

Filed Oct. 27, 1960 4 Sheets-Sheet 1

INVENTOR.

GEORGE E. COMSTOCK 3D

BY

Alfred W. Barber

ATTORNEY

*INVENTOR.*
GEORGE E. COMSTOCK 3D
*BY* Alfred W. Barber
ATTORNEY

CODE GENERATOR WITH NON-CONTACTING COUPLING TO CHARACTER KEYS

Filed Oct. 27, 1960 4 Sheets-Sheet 3

*INVENTOR.*
GEORGE E. COMSTOCK 3D.
*BY* Alfred W. Barber
ATTORNEY

INVENTOR.
GEORGE E. COMSTOCK 3D
BY Alfred W. Barber
ATTORNEY

United States Patent Office 3,119,996 Patented Jan. 28, 1964

3,119,996
CODE GENERATOR WITH NON-CONTACTING COUPLING TO CHARACTER KEYS

George E. Comstock 3d, Huntington, N.Y., assignor to Potter Instrument Co., Inc., Plainview, N.Y., a corporation of New York Filed Oct. 27, 1960, Ser. No. 65,374
4 Claims. (Cl. 340—365)

The present invention concerns code generators and, in particular, methods of and means for generating coded signals directly from type bat keys as used in typewriters and without utilizing contactors of any description.

Many applications exist for code generators which generate coded signals representing alphabetical and numerical characters. There are many such generators in existance and, in general, they are more or less complicated devices. One simple way in which coded signals may be generated from the operation of keys as found in a typewriter is to provide a number of electrical contacts on each key for closing circuits to represent the corresponding code. Such a device, however, suffers from all the disadvantages attendant on the use of electrical contactors.

According to the present invention, coded signals are generated by depressing keys which cause circuit changes to represent the coded signal without contacts of any kind. Each key is provided with one or more tabs which influences one or more magnetic circuits in the proper combination to generate the coded signal. In its preferred form each of the key mounted tabs modifies the inductance of a special inductor and the resulting desired signal is derived from a simple bridge circuit containing the inductor. Thus, for a six level code, six inductors are utilized and each key of the associated keyboard carries one or more tabs to influence one or more of these inductors.

Accordingly, the main object of the present invention is to provide a method of and means for generating coded signals directly from the operation of keys on a keyboard and without electrical contacts of any description.

Another object is to provide a code generator requiring a minimum of parts.

Still another object is to provide a code generator which exhibits long trouble-free life characteristics.

A further object is to provide a code generator which is simple and inexpensive.

These and other objects will be apparent from a detailed description of the invention given in connection with the various figures of the drawing.

Figure 1:
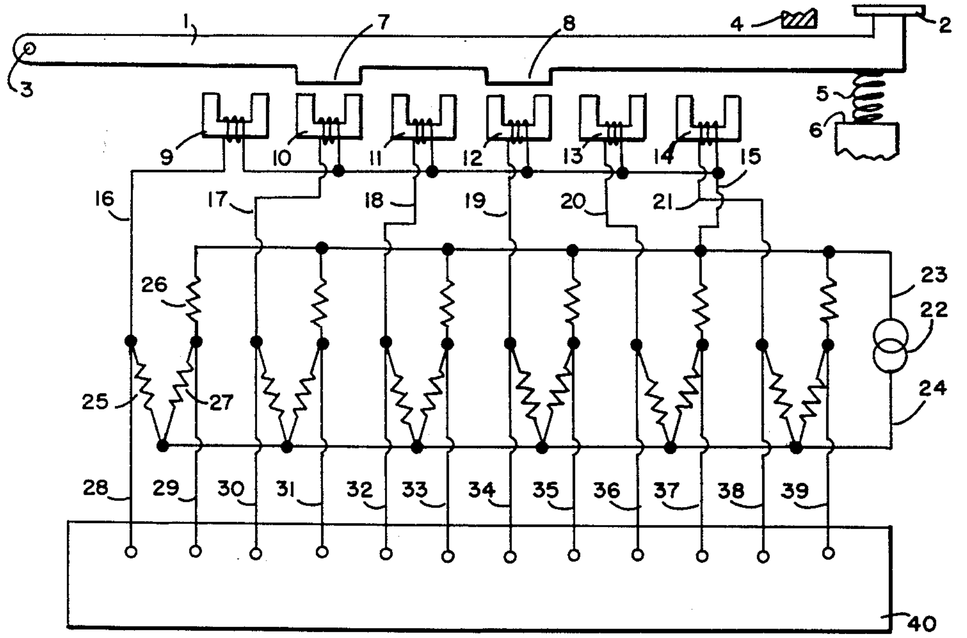
FIG. 1 shows a schematic representation of the preferred form of the present invention.
Figure 3:
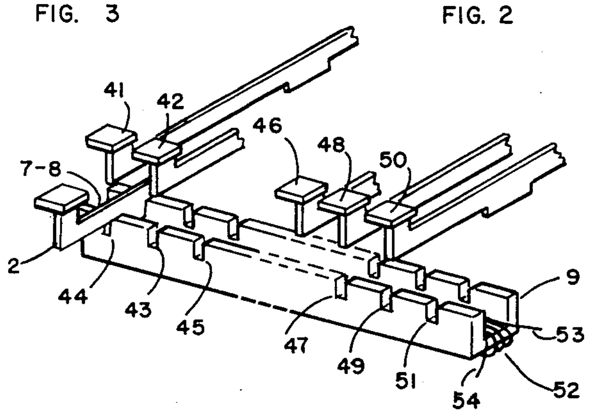
FIG. 3 shows another view of the form of the invention shown in FIG. 1.

FIG. 1 shows a key bar 1 with a key 2, hinged on pivot 3 with return spring 5 resting on surface 6 and provided with stop 4. This key and bar is typical of a plurality of such keys and bars making up the present device there being one key and bar for each letter or character to be utilized. Each key bar is provided with one or more tabs representing the code for the particular character represented by that key. Each tab is positioned to affect the inductance of a long slotted inductor running under the key bar as shown at 9 thru 14. The particular key bar shown in FIG. 1 has tabs 7 and 8 which when key 2 is depressed fit into slots in inductors 10 and 12 and if these tabs are of magnetic material will increase the inductance of these inductors. These tabs may, for example, be made of high permeability ferrite although other magnetically permeable materials such as silicon steel may be used. FIG. 3 more clearly shows the slots at 43, 44, 45 . . . 47, 49 and 51 in the long inductor 9. The tabs effectively bridge the open side of the inductors seen in FIG. 1 increasing their inductance by decreasing the reluctance of the magnetic path. Returning to FIG. 1 in order to complete the generation of the code, the long inductors are connected in a suitable translating circuit such as the bridge circuits shown energized from a suitable source of alternating current 22 over leads 23 and 24. Inductor 9, for example is connected with its winding which passes around its entire length connected over leads 16 and 17 as one arm of the bridge completed by impedances 25, 26 and 27. The bridge impedances may be chosen to balance the bridge when inductor 9 is at minimum inductance, i.e. without any bridging key tabs in its circuit so that when a tab is moved into one of its slots by depressing a key, an output is provided over leads 28 and 29 to utilization means 40. Similarly, each of the other long inductors 10, 11, 12, 13 and 14 is connected in a bridge circuit over common lead 15 and individual leads 17, 18, 19, 20 and 21 and the corresponding bridge output signals is applied to the utilization means 40 over leads 30—31, 32—33, 34—35, 36—37 and 38—39 respectively. The final coded signals may be alternating current signals or perhaps more conveniently direct current signals derived from the alternating current signals by rectification (not shown).

Figure 2:
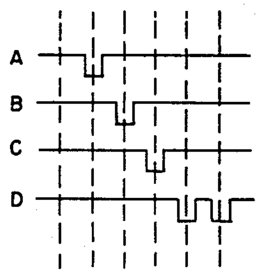
FIG. 2 shows representations of various coded signals.

FIG. 2 shows some typical code signals generated as set forth above in which each of the vertical dotted lines may represent one of the six code channels and the lines designated A, B, C and D the corresponding coded signals as generated by a system in accordance with the present invention.

FIG. 3 shows a different view of the key arrangement according to the present invention. This view shows one long inductor 9 slotted at 43, 44, 45, 47, 49 and 51 and to be operated on by keys 2, 41, 42, 46, 48 and 50 and being provided with winding 52 terminated by leads 53 and 54. It will be understood that inductor 9 is the same as inductor 9 shown in FIG. 1 and that additional similar inductors will go to make up a complete code generator as also shown in FIG. 1 by inductors 10 through 14. The number of inductors and keys in a given system depends on the code to be generated and the number of characters to be utilized.

Figure 4:
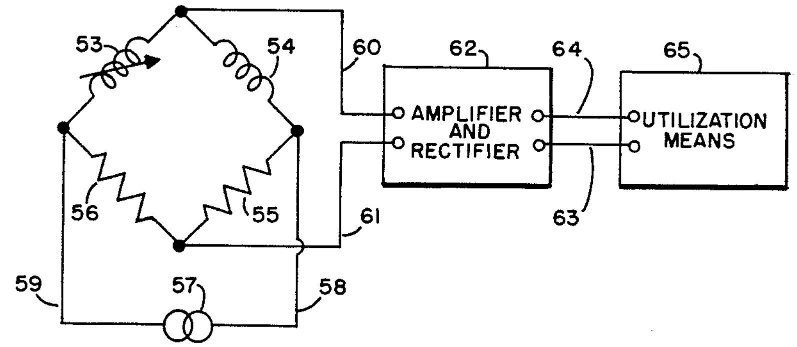
FIG. 4 shows an alternate circuit for generating the coded signals.

One manner in which signals may be derived from the inductors is shown in the circuit of FIG. 4. In this circuit the inductor 53 experiencing inductance changes due to the key tabs is connected in a bridge circuit with fixed inductor 54 and impedance arms 55 and 56. The bridge is excited with an alternating current from a suitable source 57 coupled over leads 58 and 59 while the output of the bridge is taken over leads 60 and 61 and applied to amplifier 62. The output of amplifier 62 is applied to utilization means 65 over leads 63 and 64. If the bridge elements are chosen to balance the keyed signal inductor 53 at its minimum inductance, the bridge will be unbalanced and an output signal will be generated when the inductance is increased by the presence of a key tab in one of its slots (see key 2 in FIG. 3). This signal may be a positive or a negative signal depending on the rectifier connection in the amplifier/rectifier 62.

Figure 5:
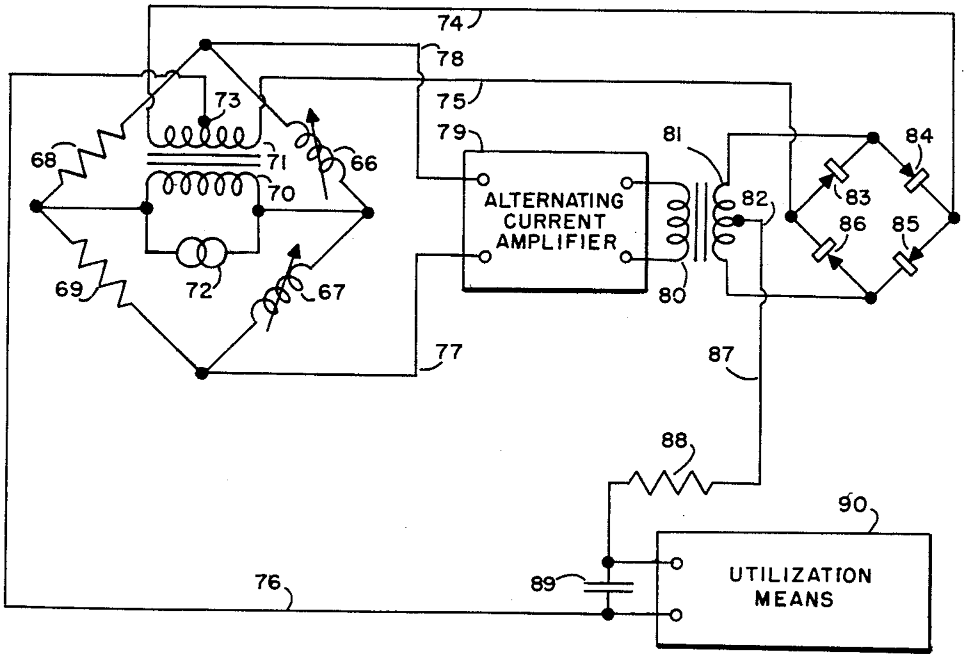
FIG. 5 shows a circuit for generating a signal utilizing two inductors.

FIG. 5 shows a circuit utilizing two keyed inductors 66 and 67 in a bridge circuit including balancing impedances 68 and 69 supplied with alternating current from a suitable source 72. When this bridge circuit is connected to a phase sensitive bridge comprising rectifiers 83, 84, 85 and 86, a bi-polar direct current output to utilization means 90 may be obtained. Signal from source 72 through transformer 70—71 is applied across one diagonal of the bridge over leads 74—75. The unbalanced output signal from the inductor bridge is applied to amplifier 79 over leads 77—78 and the amplified signal is applied to the other diagonal of the phase sensitive bridge through transformer 80—81. Now if a signal is derived from center tap 73 to center tap 82 over leads 76 and 87 a bi-polar signal will be applied to utilization means 90 through the ripple filter comprising resistor 88 in series and capacitor 89 in shunt. The inductor bridge when balanced at some intermediate point, wherein inductance 67, for example, is fixed and inductance 66 is one of the keyed inductances at a point midway in the key travel, will provide one polarity of direct current output at the utilization means when the key is up and the opposite polarity when the key is down. Similarly, two inductors (the second not shown) may be provided for each position, one above the key arm and the other below so that when the key is up, the upper inductance has a maximum value and when the key is down the other has a maximum inductance. This arrangement is shown where inductor 66 is the first inductor below the key and inductor 67 is the second inductor and above the key. As in the case of the single variable inductor, this circuit may be balanced at an intermediate point in order to provide a bi-polar direct current current output. If the two inductors are similar in value and construction, this arrangement will provide a high degree of temperature stability and double the sensitivity of the single variable inductor. This double inductor system being more stable and providing twice the output signal is much less likely to require attention or adjustment.

Figure 8:
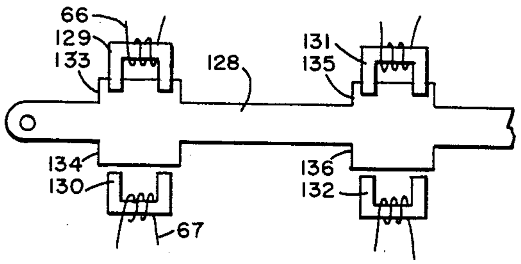
FIG. 8 shows one form of two inductor construction.

FIG. 8 shows a system utilizing the double inductors described above wherein a first inductor 129 carrying coil 66 is located above key bar 128 and the second inductor 130 carrying coil 67 is located below the key bar 128. Coils 66 and 67 are intended to be the same as those bearing similar numbers shown in FIG. 5. When key bar 128 is up or in its undepressed position, tab 133 shunts inductor 129 increasing the inductance of coil 66 and tab 134 is withdrawn from inductor 130 decreasing the inductance of coil 67. When key bar 128 is actuated (depressed), the reverse situation is set up so that the inductance of coil 66 is reduced and the inductance of coil 67 is increased. A second double inductor 131—132 is shown to be acted on by tabs 135 and 136 respectively.

Figure 6:
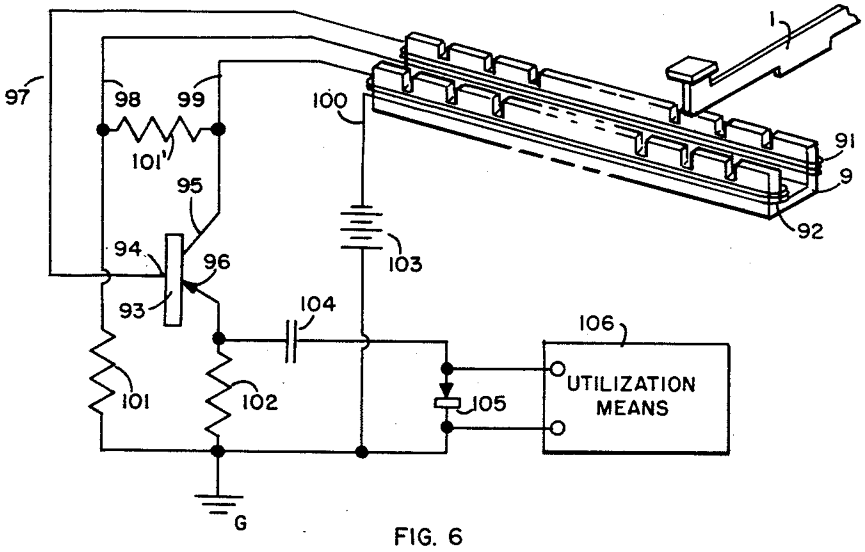
FIG. 6 shows an oscillator circuit for generating a signal from a keyed inductor.

FIG. 6 shows an alternate method of deriving signals from the shunted inductors. Here is shown inductor core 9 as before but this time wound with two coils 91 and 92. The coupling between coils 91 and 92 is increased by the tabs on the key bars and this effect may be utilized in any suitable manner as, for example, utilizing the two coils in a feed-back oscillator circuit which is adjusted to oscillate in the presence of the increased coupling provided by the key tabs and to maintain a non-oscillating condition when the tab is withdrawn. Such an oscillating circuit is provided by transistor 93 which includes base 94, collector 95 and emitter 96. Coil 91 is connected between ground G through resistor 101 to base 94 over leads 97 and 98 while coil 92 is connected between bias source 103 and collector 95 over leads 99 and 100. The circuit is completed by emitter resistor 102 and resistor 101 for supporting base bias across resistor 101'. The signal produced, when core 9 is shunted by a key tab causing the circuit to oscillate, is applied over coupling capacitor 104 to rectifier 105 for providing a direct current component. This output across rectifier 105 is applied to utilization means 106.

Figure 7:
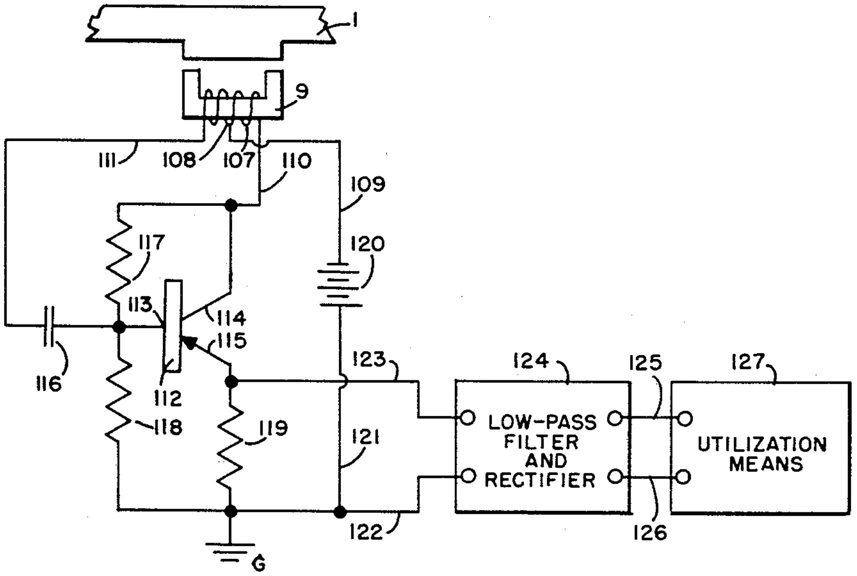
FIG. 7 shows a keyed inductor circuit capable of generating a frequency shift signal.

FIG. 7 shows still another way in which a signal may be generated in code configuration directly from the keys. Here the signal generated is in the form of a frequency shift. The core 9 is wound with a coil 107 tapped at 108. This coil 107 is connected to a transistor 112 in a manner to provide an oscillating circuit. When key 1 is up, the frequency will be higher and when key 1 is depressed the frequency will be lower in accordance with the lower and higher inductance states respectively. Coil 107 is connected over lead 111 and through blocking capacitor 116 to base 113, over lead 110 to collector 114 and over lead 109 to bias source 120. Emitter 115 is connected through resistor 119 to ground G. Bias is supplied to base 113 by the voltage divider formed by resistors 117 and 118. The return of bias source 120 to ground G is provided by lead 121. The signal generated is taken off across resistor 119 over leads 122 and 123 and may be utilized directly as a frequency shift signal or an off-on signal may be provided by utilizing low-pass filter and rectifier 124 wherein the cut-off frequency of the filter is chosen to lie between the high and low frequencies generated by the oscillator. The on-off signal from 124 is applied over leads 125 and 126 to utilization means 127.

Figure 9:
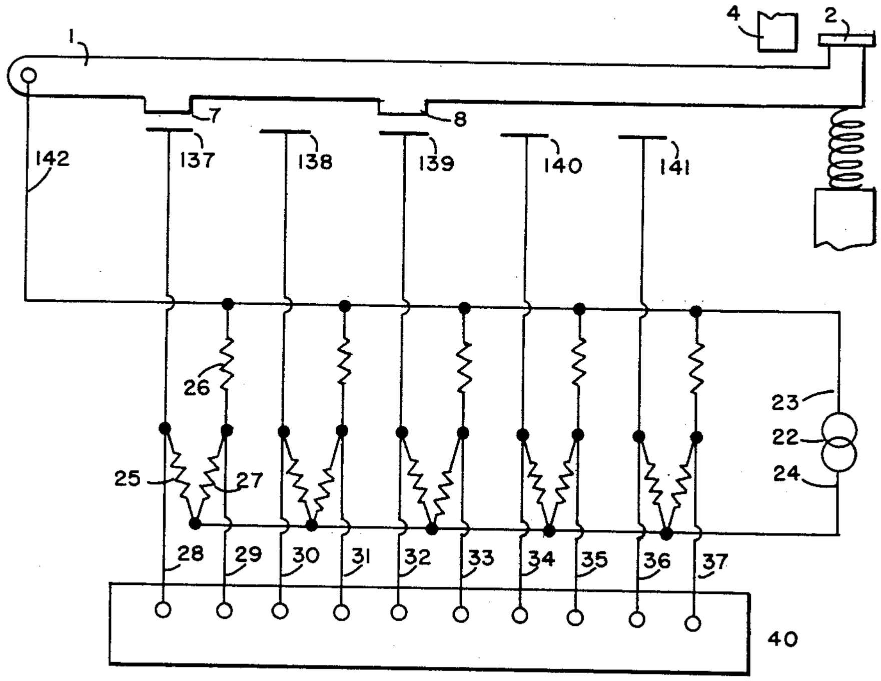
FIG. 9 shows a keyed capacitor circuit.

FIG. 9 shows an alternate form of the present invention in which change in capacitance is utilized instead of change in inductance. The circuit may include bridges in the same manner as in FIG. 1 but in place of inductors such as 9, 10, etc. capacitor elements 137, 138, 139, 140 and 141 are utilized and the tabs on the key bar 1 such as 7 and 8 connected to one side of the bridge circuits over lead 142 vary the capacity to the opposed plates. Thus when key 2 is depressed the capacitances formed by 7 and 137 and by 8 and 139 are increased affecting the balance of their respective bridge circuits to generate unbalance signals therein.

It is thus seen that the present invention concerns a simple and direct method of and apparatus for generating coded signals in response to the actuation of keys similar to those to be found on a conventional typewriter. These keys affect the impedances of signal generating circuits to provide the coded signals without conductive contact thereby constituting a system which is not subject to the problems caused by wear or changing contact resistance. The generating elements may be termed reactive in contrast to circuits involving resistors or contacts which may be termed conductive. The coupling between the keys and the common reactive elements is also reactive in nature.

While only a few forms of the present invention have been shown and described, many modifications will be apparent to those skilled in the art and within the spirit and scope of the invention as set forth in particular in the appended claims.

What is claimed is:

1. In a code generating system, the combination of, a key adapted to be moved a predetermined distance from a retracted, non-operating position to an operating position, an electrical bridge-type circuit having a predetermined balanced operating state, impedance means connected with said electrical circuit and having a preselected value to contribute toward said predetermined balanced operating state, and said key having a portion approaching said impedance means without contact when said key is operated to alter said preselected value of said impedance means, whereby said predetermined balanced operating state of said electrical circuit is changed to an unbalanced state representing a predetermined code.

2. In a code generating system, the combination of, a key adapted to be moved a predetermined distance from a retracted, non-operating position to an operating position representing a predetermined code, an electrical circuit having a predetermined balanced operating state, an electrical circuit component connected with said electrical circuit to contribute toward said predetermined balanced operating state, and said key having a portion to affect said component without physical contact when said key is operated to change the value of its contribution toward said predetermined balanced operating state, whereby said predetermined state of said electrical circuit is changed to an unbalanced state representing a coded character.

3. In a code generating system, the combination of, an electrical circuit having a balanced operating state, an impedance connected with said electrical circuit so that said electrical circuit is adapted to have at least two operating states, a movable member adapted for movement between an operating position and a non-operating position, and at least a portion of said movable member having a characteristic capable of affecting said impedance, whereby said electrical circuit has one operating state that is balanced electrically when said impedance is unaffected by said portion of the movable member and said electrical circuit operates in the other of said two states when said movable member is moved to affect said impedance without physical contact therewith.

4. In a code generating system, the combination of, an electrical circuit having a balanced operating state, an impedance connected with said electrical circuit so that said electrical circuit is adapted to have at least two operating states, a key adapted for movement between a first, non-operating position and a second, operating position, and means connected with said key and adapted to affect the value of said impedance so that said electrical circuit is in its balanced operating state when said key is in said first position and said electrical circuit is in the other of said operating states when said key is in said second position.

References Cited in the file of this patent

UNITED STATES PATENTS

| | | |
|---|---|---|
| 2,410,833 | Meacham | Nov. 12, 1946 |
| 2,427,213 | Jewell | Sept. 9, 1947 |
| 2,814,031 | Davis | Nov. 19, 1957 |
| 2,856,256 | Carman et al. | Oct. 14, 1958 |
| 3,017,463 | Dinsmore et al. | Jan. 16, 1962 |